US012683823B2

(12) United States Patent
Law et al.

(10) Patent No.: US 12,683,823 B2
(45) Date of Patent: Jul. 14, 2026

(54) CONFERENCING SESSION FACILITATION SYSTEMS AND METHODS USING VIRTUAL ASSISTANT SYSTEMS AND ARTIFICIAL INTELLIGENCE ALGORITHMS

(71) Applicant: Shure Acquisition Holdings, Inc., Niles, IL (US)

(72) Inventors: Daniel Aaron Law, Glencoe, IL (US); Chad Wolf Reid, Chicago, IL (US); Kevin Othel Foy, Chicago, IL (US)

(73) Assignee: SHURE ACQUISITION HOLDINGS, INC., Niles, IL (US)

( * ) Notice: Subject to any disclaimer, the term of this patent is extended or adjusted under 35 U.S.C. 154(b) by 0 days.

(21) Appl. No.: 18/677,500

(22) Filed: May 29, 2024

(65) Prior Publication Data

US 2025/0039008 A1    Jan. 30, 2025

Related U.S. Application Data

(63) Continuation of application No. 17/655,280, filed on Mar. 17, 2022, now Pat. No. 12,028,178.

(60) Provisional application No. 63/163,421, filed on Mar. 19, 2021.

(51) Int. Cl.
*H04L 12/18* (2006.01)
*G10L 15/22* (2006.01)

(52) U.S. Cl.
CPC .......... *H04L 12/1822* (2013.01); *G10L 15/22* (2013.01); *H04L 12/1827* (2013.01); *G10L 2015/223* (2013.01)

(58) Field of Classification Search
CPC ...... G06F 3/167; G06F 3/04817; G06F 9/453; G06F 11/1464; G06F 16/3329; G10L 15/22; H04L 63/0861
See application file for complete search history.

(56) References Cited

U.S. PATENT DOCUMENTS

| | | | |
|---|---|---|---|
| 9,172,747 B2 | 10/2015 | Walters | |
| 9,786,294 B1 * | 10/2017 | Bezos | G06F 3/165 |
| 10,264,214 B1 | 4/2019 | Kumar | |
| 10,531,157 B1 * | 1/2020 | Loritsch | H04N 21/4524 |

(Continued)

FOREIGN PATENT DOCUMENTS

CN        102510426        6/2012

OTHER PUBLICATIONS

Cisco, Webex Assistant for Webex Meetings, "Your digital AI meeting assistant is arriving," 2020, 6 pp.

(Continued)

*Primary Examiner* — Chirag R Patel
(74) *Attorney, Agent, or Firm* — Alston & Bird LLP

(57) ABSTRACT

Conferencing system and methods for facilitating conferencing sessions in an environment using virtual assistant systems and artificial intelligence algorithms are disclosed. Virtual assistant systems may be integrated into devices of the conferencing system in order to enable higher quality experiences with the virtual assistant by providing improved audio and visual feedback. The conferencing system can provide improved control, configuration, and interaction with the devices of the conferencing system through use of artificial intelligence algorithm that processes voice commands and characteristics of the environment and conferencing sessions, which can result in better system performance and increased user satisfaction.

20 Claims, 5 Drawing Sheets

(56) References Cited

U.S. PATENT DOCUMENTS

| | | | | |
|---|---|---|---|---|
| 10,540,971 | B2 | 1/2020 | Kumar | |
| 10,580,266 | B2 | 3/2020 | Hanes | |
| 10,684,683 | B2 | 6/2020 | Deleeuw | |
| 10,771,272 | B1 | 9/2020 | Ghanaie-Sichanie | |
| 11,375,058 | B2* | 6/2022 | Kuzhiyil | H04M 1/72442 |
| 11,763,835 | B1* | 9/2023 | Bay | H04R 1/028 |
| | | | | 704/275 |
| 2008/0184115 | A1 | 7/2008 | Back | |
| 2010/0238842 | A1 | 9/2010 | Narayanan | |
| 2015/0201023 | A1 | 7/2015 | Kotab | |
| 2018/0176713 | A1 | 6/2018 | Linsky | |
| 2018/0267774 | A1* | 9/2018 | Williams | G06F 3/041 |
| 2019/0080698 | A1* | 3/2019 | Miller | G10L 17/04 |
| 2019/0173687 | A1 | 6/2019 | Mackay | |
| 2019/0311718 | A1* | 10/2019 | Huber | G10L 15/22 |
| 2019/0392395 | A1 | 12/2019 | Valliani | |
| 2020/0029152 | A1* | 1/2020 | Cox | H04R 3/00 |
| 2020/0104653 | A1 | 4/2020 | Solomon | |
| 2020/0104668 | A1 | 4/2020 | Sanghavi | |
| 2020/0127988 | A1* | 4/2020 | Bradley | H04L 12/2809 |
| 2020/0137230 | A1 | 4/2020 | Spohrer | |
| 2020/0145616 | A1 | 5/2020 | Nassar | |
| 2020/0228358 | A1 | 7/2020 | Rampton | |
| 2020/0234696 | A1 | 7/2020 | Vashisht | |
| 2020/0258525 | A1 | 8/2020 | Mcquiston | |
| 2020/0372140 | A1 | 11/2020 | Jaber | |
| 2020/0382646 | A1 | 12/2020 | Rao | |
| 2021/0074284 | A1 | 3/2021 | Kapinos | |
| 2022/0246160 | A1* | 8/2022 | Munoz | G10L 21/0208 |

OTHER PUBLICATIONS

Comeau, "Logitech Introduces Integration with Alexa for Business for Zoom Rooms," My Tech Decisions, Jul. 14, 2020, 4 pp.

Dynamic Digital Advertising, LLC, Virtual Digital Assistants, Downloaded from website https://artificialintelligenceb2b.com/virtual-assistant-bot.html> on Sep. 7, 2020, 3 pp.

Microsoft, Cortana, "Your personal assistant in Microsoft 365," 2020, 3 pp.

Sevilla, "Get Ready: Voice Assistants Are Coming to Your Conference Room," PCMagazine, Apr. 16, 2019, 11 pp.

* cited by examiner

300

302 — Detect Characteristics of Environment and/or Conferencing Session

304 — Receive Signal Associated with Voice Command

306 — Determine Parameter of Device to Control Based on Characteristics and Voice Command, using AI Algorithm 308 — Transmit Signal to Control Parameter of Device

400

402 — Detect Presence of Devices and Sensors

404 — Route Connections Between Devices, Sensors, and/or Virtual Assistant System, Based on the Detection 406 — Configure Audio Processing Between the Device, Sensors, and/ or the Virtual Assistant System, Based on the Detection

CONFERENCING SESSION FACILITATION SYSTEMS AND METHODS USING VIRTUAL ASSISTANT SYSTEMS AND ARTIFICIAL INTELLIGENCE ALGORITHMS

CROSS-REFERENCE TO RELATED APPLICATION

This application is a continuation of U.S. patent application Ser. No. 17/655,280, filed on Mar. 17, 2022, which claims the benefit of and priority to U.S. Provisional Patent Application No. 63/163,421, filed on Mar. 19, 2021. The contents of both applications are incorporated herein in their entireties.

TECHNICAL FIELD

This application generally relates to a conferencing system for facilitating conferencing sessions in an environment using virtual assistant systems and artificial intelligence algorithms. In particular, this application relates to systems and methods that integrate virtual assistant systems with the devices of the conferencing systems, as well as systems and methods that utilize signals from the virtual assistant system, characteristics of the environment, and/or characteristics of the conferencing session to determine and control parameters of devices through the use of the artificial intelligence algorithms.

BACKGROUND

Conferencing environments, such as conference rooms, boardrooms, video conferencing settings, and the like, typically involve the use of a discrete conferencing device comprising one or more microphones for capturing sound from various audio sources active in such environments. The audio sources may include in-room human talkers, and in some cases, loudspeakers playing audio received from human talkers that are not in the room, for example. The captured sound may be disseminated to a local audience in the environment through amplified speakers (for sound reinforcement), and/or to others remote from the environment (such as, e.g., via a telecast and/or webcast) using communication hardware included in or connected to the conferencing device. The conferencing device may also include one or more speakers or audio reproduction devices for playing out loud audio signals received, via the communication hardware, from the human talkers that are remote from the conferencing environment. Other hardware included in a typical conferencing device may include, for example, one or more processors, a memory, input/output ports, and user interface/controls.

Conferencing devices are available in a variety of sizes, form factors, mounting options, and wiring options to suit the needs of particular environments. The type of conferencing device and its placement in a particular conferencing environment may depend on the locations of the audio sources, physical space requirements, aesthetics, room layout, and/or other considerations. For example, in some environments, the conferencing device may be placed on a table or lectern to be near the audio sources. In other environments, the microphones for a given conference device may be mounted overhead to capture the sound from the entire room, for example.

Conferencing software (e.g., Microsoft Teams, Zoom, Skype, BlueJeans, Cisco WebEx, GoToMeeting, Join.me, etc.) may be in communication with a conferencing device in an environment to allow communication between local near-end participants and remote far-end participants during conference calls, meetings, etc. For example, the conferencing software can receive far-end audio signals that can be played back to the local participants, and can transmit audio signals from the near-end to the remote participants. The conferencing software may be stored and be executed on a computing device.

The environment may also include voice-enabled electronic devices that serve as virtual assistants for obtaining information, controlling other devices, etc. For example, virtual assistants such as Amazon Alexa, Google Assistant, and the like, may be accessible on standalone electronic devices such as Amazon Echo, Google Home, and other similar devices. However, using such a standalone voice-enabled device in a large environment (e.g., a conference room) may not work well, particularly for people who are farther away from where the device is situated. For example, the device may not be able to optimally detect voice commands from far away people, and the audio and visual feedback from the device (e.g., which may denote the state of the virtual assistant) may be difficult for far away people to discern.

Furthermore, there may be challenges when there are virtual assistant devices present in an environment (e.g., a conference room) where local participants and remote participants are communicating during a conference call or other meeting. While the virtual assistant devices may be intended to be controlled by the local participants, the virtual assistant devices may unintentionally respond to (and therefore be controlled by) the remote participants. For example, a remote participant may inadvertently utter the wake word for a virtual assistant device while discussing a meeting topic, which can cause undesired operation of the virtual assistant device.

In addition, the initial and ongoing configuration and control of devices and components (e.g., virtual assistants) of the conferencing system can be complex and difficult for some users. For example, audio sources (e.g., human talkers), transducers (e.g., microphones and/or loudspeakers), and/or objects in the environment may change location. It may therefore be desirable to move and/or deploy lobes and nulls of the microphones or loudspeakers. However, it may be difficult or inconvenient for some users to utilize the interface of current conferencing systems to configure and control the systems. Furthermore, even if users can configure and control such current conferencing systems, the users may incorrectly configure the systems. As a result, the capture and/or reproduction of sound in the environment may be suboptimal, with reduced system performance and decreased user satisfaction.

Accordingly, there is an opportunity for systems and methods that address these concerns. More particularly, there is an opportunity for a conferencing system that facilitates conferencing sessions in an environment using virtual assistant systems and artificial intelligence algorithms. Furthermore, there is an opportunity for systems and methods that integrate virtual assistant systems with the devices of the conferencing systems, as well as systems and methods that utilize signals from the virtual assistant system, characteristics of the environment, and/or characteristics of the conferencing session to determine and control parameters of devices through the use of the artificial intelligence algorithms.

SUMMARY

The invention is intended to solve the above-noted problems by providing systems and methods that are designed to, among other things: (1) integrate a virtual assistant with a conferencing system to leverage its transducers to capture audio for and reproduce audio from the virtual assistant, and to provide visual feedback on the state of the virtual assistant via visual indicator devices and/or devices of the conferencing system; (2) utilize artificial intelligence algorithms to process signals associated with voice commands for the virtual assistant, characteristics of an environment, and/or characteristics of a conferencing session to determine parameters of devices to control; and (3) route connections and configure audio processing between devices, sensors, and/or the virtual assistant.

In an embodiment, a conferencing system configured to facilitate a conferencing session in an environment includes at least one device including one or more of a microphone, a loudspeaker, a digital signal processor, or a visual indicator device; at least one sensor configured to detect one or more of a characteristic of the environment or a characteristic of the conferencing session; a memory including data related to one or more of the characteristic of the environment or the characteristic of the conferencing session; a virtual assistant system; and a processor in communication with the at least one device, the at least one sensor, the memory, and the virtual assistant system. The processor may be configured to receive a signal associated with a voice command from the virtual assistant system; determine a parameter of the at least one device to control, based on an artificial intelligence algorithm that analyzes (1) the signal associated with the voice command and (2) one or more of the characteristic of the environment or the characteristic of the conferencing session; and responsive to the determination, transmit a signal to control the parameter of the at least one device.

In another embodiment, a conferencing system includes at least one device including one or more of a microphone, a loudspeaker, a digital signal processor, or a visual indicator device; a virtual assistant system; and a processor in communication with the at least one device and the virtual assistant system. The processor may be configured to detect the at least one device; route connections between the at least one device and the virtual assistant system, based on the detection; and configure processing of audio between the at least one device and the virtual assistant system, based on the detection. A voice command sensed by the at least one device may be processed and routed to the virtual assistant system, based on the routed connections and configured processing. The audio from the virtual assistant system may be processed and routed to the at least one device, based on the routed connections and configured processing.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
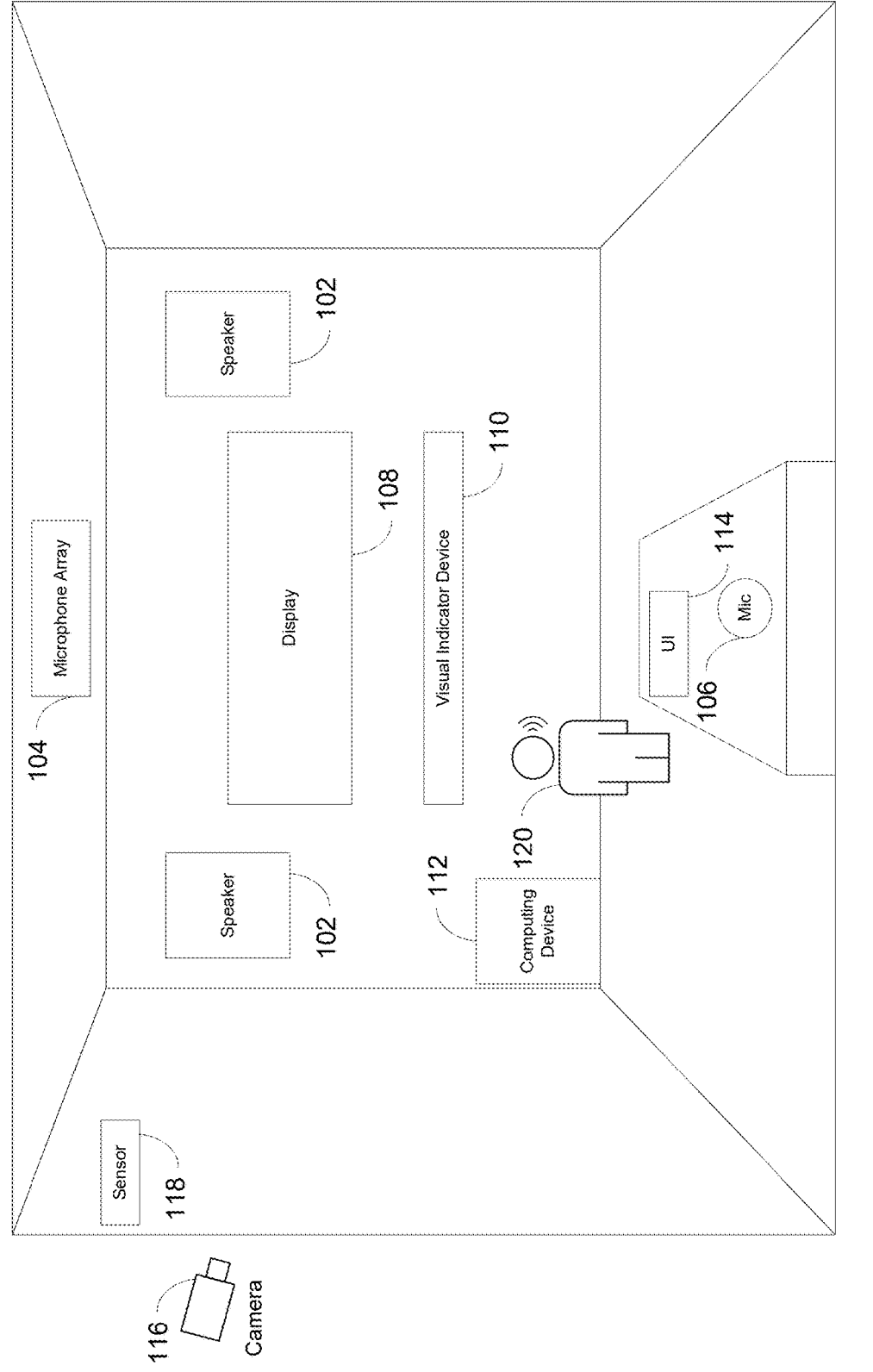
FIG. 1 is an exemplary depiction of a physical environment including a conferencing system that can be integrated with a virtual assistant and controllable using artificial intelligence algorithms, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The systems and methods described herein can enable the integration of a virtual assistant with a conferencing system to utilize the transducers of the conferencing system (e.g., microphones and loudspeakers). For example, microphones of the conferencing system can be used to capture audio (e.g., voice commands) from persons in an environment and route the captured audio to the virtual assistant, while loudspeakers of the conferencing system can be used to reproduce audio from the virtual assistant. The audio can be automatically routed and/or processed through various devices in the conferencing system to enable the virtual assistant to be integrated, e.g., automatically passing room audio from a mixer to both the virtual assistant and to conferencing software, or mixing far-end audio with audio from the virtual assistant. As another example, standalone visual indicator devices and/or existing devices of the conferencing system (e.g., displays or user interfaces) can show visual feedback on the state of the virtual assistant, such as whether the virtual assistant is listening, processing requests it has heard, or responding. In this way, the conferencing system can enable higher quality experiences with the virtual assistant in environments such as larger rooms by providing improved audio and visual feedback.

The systems and methods described herein can also enable parameters of devices of the conferencing system to be controlled through the use of artificial intelligence algorithms. The artificial intelligence algorithms can process signals associated with voice commands for the virtual assistant, characteristics of an environment, and/or characteristics of a conferencing session, in order to determine the parameters of the devices to be controlled. The parameters of the device that can be controlled can include, for example, the deployment or location of a beam of a microphone, the volume of a loudspeaker, a parameter of a digital signal processor, a state of a visual indicator device, and/or a visual indicator of a microphone or loudspeaker. The characteristics of the environment can include the presence and/or location of objects (e.g., people, furniture, equipment, etc.), which can be determined using sensors (e.g., camera, motion detector, Bluetooth sensor, Wi-Fi sensor, location sensor, etc.). The characteristics of the conferencing session can include, for example, scheduling information, participant information, meeting topic information, meeting location information, a far-end audio signal, etc.

As an example, a microphone can capture a voice command from a person in a conference room, where the voice command relates to increasing the volume of the far-end audio being played on a loudspeaker in the room. After determining where people are located in the room (i.e., a characteristic of the environment), such as by using a camera or location sensor, the artificial intelligence algorithm may determine how to steer lobes of a loudspeaker towards those locations. The coordinates of these locations may then be sent to a beamformer to steer the lobes of the loudspeaker. As another example, the microphone can capture a voice command that requests the system to improve the overall quality of near-end audio being transmitted to the far-end, e.g., if the remote participant says they are having a hard time hearing the local participant. The artificial intelligence algorithm may utilize characteristics of the environment (e.g., locations of objects that may be causing undesirable sound reflections) and/or characteristics of the conferencing session (e.g., the far-end signal), and determine parameters of the digital signal processor to adjust. Such parameters may include settings and thresholds for automatic gain control, acoustic echo cancellation, noise cancellation, and the like. Signals to adjust these parameters may then be sent to the digital signal processor. In this way, the conferencing system can provide improved control, configuration, and interaction with the devices of the conferencing system, resulting in better system performance and increased user satisfaction.

FIG. 1 is an exemplary depiction of a physical environment 100 in which the systems and methods disclosed herein may be used. In particular, FIG. 1 shows a perspective view of an exemplary conference room including various transducers and devices of a conferencing system, as well as other objects. It should be noted that while FIG. 1 illustrates one potential environment, it should be understood that the systems and methods disclosed herein may be utilized in any applicable environment, including but not limited to offices, huddle rooms, theaters, arenas, music venues, etc.

The system in the environment 100 shown in FIG. 1 may include various components, such as loudspeakers 102, a microphone array 104, a tabletop microphone 106, a display 108, a visual indicator device 110, a computing device 112, a user interface 114, a camera 116, and a sensor 118. The components may be wired or wireless. The environment 100 may also include one or more persons/human talkers 120 and/or other objects (e.g., musical instruments, phones, tablets, computers, HVAC equipment, etc.). In embodiments, one or more of the components may include a digital signal processor, wireless receivers, wireless transceivers, etc. It should be understood that the components shown in FIG. 1 are merely exemplary, and that any number, type, and placement of the various components in the environment 100 are contemplated and possible. The operation and connectivity of the system is described in more detail below.

The types of transducers (e.g., microphone and loudspeakers) and their placement in a particular environment may depend on the locations of the audio sources, listeners, physical space requirements, aesthetics, room layout, stage layout, and/or other considerations. For example, microphones may be placed on a table or lectern near the audio sources, such as the microphone 106, or attached to the audio sources, e.g., a performer. Microphones may also be mounted overhead to capture the sound from a larger area, such as an entire room, e.g., the microphone array 104. Similarly, the loudspeakers 102 may be placed on a wall or ceiling in order to emit sound to listeners in the environment 100. Microphones and loudspeakers are available in a variety of sizes, form factors, mounting options, and wiring options to suit the needs of particular environments.

Typically, the conference room of the environment 100 may be used for meetings where local participants communicate with each other and/or with remote participants. As such, the microphone array 104 and/or the tabletop microphone 106 can detect and capture sounds from audio sources within the environment 100. The audio sources may be one or more human talkers 120, for example. In a common situation, the human talkers 120 may be seated in chairs at a table, although other configurations and placements of the audio sources are contemplated and possible. Other sounds may be present in the environment 100 which may be undesirable, such as noise from ventilation, other persons, electronic devices, shuffling papers, etc. Other undesirable sounds in the environment 100 may include sound from the remote meeting participants (i.e., the far-end) that is reproduced on the loudspeakers 102.

Each of the microphone elements in the array microphone 104 and the microphone 106 may detect sound and convert the sound to an analog audio signal. Components in the array microphone 104 and the microphone 106, such as analog to digital converters, processors, and/or other components, may process the analog audio signals and ultimately generate one or more digital audio output signals. The digital audio output signals may conform to the Dante standard for transmitting audio over Ethernet, in some embodiments, or may conform to another standard and/or transmission protocol. In embodiments, each of the microphone elements in the array microphone 104 and the microphone 106 may detect sound and convert the sound to a digital audio signal.

One or more pickup patterns may be formed by the array microphone 104 and the microphone 106 from the audio signals of the microphone elements, and a digital audio output signal may be generated corresponding to each of the pickup patterns. The pickup patterns may be composed of one or more lobes, e.g., main, side, and back lobes, and/or one or more nulls. In other embodiments, the microphone elements in the array microphone 104 and the microphone 106 may output analog audio signals so that other components and devices (e.g., processors, mixers, recorders, amplifiers, etc.) external to the array microphone 104 and the microphone 106 may process the analog audio signals. In embodiments, the selection of particular microphones in the system can gate (i.e., shut off) the sound from unwanted audio sources to increase signal to noise.

The pickup patterns that can be formed by the array microphone 104 and the microphone 106 may be dependent on the type of beamformer used with the microphone elements, such as beamformer 204 in FIG. 2 described below. For example, a delay and sum beamformer may form a frequency-dependent pickup pattern based on its filter structure and the layout geometry of the microphone elements. As another example, a differential beamformer may form a cardioid, subcardioid, supercardioid, hypercardioid, or bidirectional pickup pattern. The microphone elements may each be a MEMS (micro-electrical mechanical system) microphone with an omnidirectional pickup pattern, in some embodiments. In other embodiments, the microphone elements may have other pickup patterns and/or may be electret condenser microphones, dynamic microphones, ribbon microphones, piezoelectric microphones, and/or other types of microphones. In embodiments, the microphone elements may be arrayed in one dimension or multiple dimensions.

The loudspeakers 102 may be placed on a ceiling, wall, table, etc. so that sound may be reproduced to listeners in the environment 100, such as sound from the far-end of a conference, pre-recorded audio, streaming audio, etc. The loudspeakers 102 may include one or more drivers configured to convert an audio signal into a corresponding sound. The drivers may be electroacoustic, dynamic, piezoelectric, planar magnetic, electrostatic, MEMS, compression, etc. The audio signal can be a digital audio signal, such signals that conform to the Dante standard for transmitting audio over Ethernet or another standard. In embodiments, the audio signal may be an analog audio signal, and the loudspeakers 102 may be coupled to components, such as analog to digital converters, processors, and/or other components, to process the analog audio signals and ultimately generate one or more digital audio signals.

In embodiments, the loudspeakers 102 may be loudspeaker arrays that consist of multiple drivers. The drivers may be arrayed in one dimension or multiple dimensions. Such loudspeaker arrays can generate steerable lobes of sound that can be directed towards particular locations, as well as steerable nulls where sound is not directed towards other particular locations. In embodiments, loudspeaker arrays may be configured to simultaneously produce multiple lobes each with different sounds that are directed to different locations. The loudspeaker array may be in communication with a beamformer, such as beamformer 204 in FIG. 2 described below. In particular, the beamformer may receive and process an audio signal and generate corresponding audio signals for each driver of the loudspeaker array.

The camera 116 and the sensor 118 may be used to gather characteristics and other information about the environment 100, which can be used by an artificial intelligence algorithm in determining parameters of devices to adjust, as described in more detail herein. In particular, the camera 116 may capture still images and/or video of the environment 100 where the system is located. In some embodiments, the camera 116 may be a standalone camera, and in other embodiments, the camera 116 may be a component of an electronic device, e.g., smartphone, tablet, etc. The sensor may be able to determine the presence and/or location of objects in the environment, and may include, for example, a motion detector, Bluetooth sensor, Wi-Fi sensor, location sensor, etc. The display 108 may be a television or computer monitor, for example, and may show other images and/or video, such as the remote participants of a conference or other image or video content. In embodiments, the display 108 may include microphones and/or loudspeakers.

The computing device 112 and/or the user interface 114 may include a service that communicates with a virtual assistant system (e.g., Amazon Alexa, Google Assistant, etc.). The virtual assistant system may be integrated with the components and devices of the broader system in the environment 100, such as the loudspeakers 102 and/or the microphones 104, 106. Furthermore, audio and signals to and from the virtual assistant system may be automatically routed, as described in detail herein. In embodiments, the virtual assistant system may be locally executable (e.g., on the computing device 112 or the user interface 114), and/or may be remotely executable (e.g., on a remote server). In other embodiments, the virtual assistant system may execute on a separate device that is in communication with the computing device 112 and/or the user interface 114, such as an Amazon Echo, Google Home, or similar device. Users can interact with the virtual assistant system by speaking voice commands (e.g., to ask for information, control devices, etc.) that are captured by the microphones 104, 106, for example, and the virtual assistant can respond to the voice commands with audio, video, visual indications, haptic feedback, and/or other types of responses that are reproduced on the loudspeakers 102 or other devices.

In embodiments, the user interface 114 may be (or may include) an activation switch that a person in the environment can use to control whether the virtual assistant system is listening for a voice command. This may be useful in scenarios where users may wish to ensure that the virtual assistant system does not inadvertently hear or record private or sensitive speech in the environment. In particular, users may activate the switch when they want the virtual assistant system to hear a voice command. The visual indicator device 110 (described in more detail below) may give users feedback on the state of the virtual assistant system, and work in conjunction with the activation switch. For example, the visual indicator device 110 may show a certain color (e.g., red) when the virtual assistant system is not listening, but show a different color (e.g., blue) when a user activates the switch to allow the virtual assistant system to listen for a voice command.

As a result of the integration of the virtual assistant system with the loudspeakers 102 and/or the microphones 104, 106, users in the environment can more easily interact with the virtual assistant system. In particular, the microphones 104, 106 can capture voice commands and route the signals with the captured voice commands to the virtual assistant system and/or to an artificial intelligence algorithm for processing. Audio from the virtual assistant system, e.g., responses to questions, acknowledgements of receiving the voice command, etc., can be routed to the loudspeakers 102 for reproduction in the environment 100.

The system may also include options to control the experience of remote participants at the far-end with the virtual assistant system. The options may be configurable through the user interface 114, for example, and/or via a voice command. One option may be to allow or disallow a remote participant at the far-end to interact with the virtual assistant system. For example, a remote participant may be allowed to interact with the virtual assistant system to control a presentation. In this scenario, both the audio of local participants (e.g., captured by microphones 104, 106) and the audio of remote participants can be mixed, processed, and routed to the virtual assistant system for processing. As another example, a remote participant may be disallowed from interacting with the virtual assistant system in order to prevent inadvertent voice commands. In this scenario, only the audio of the local participants (e.g., captured by microphones 104, 106) may be mixed, processed, and routed to the virtual assistant system for processing.

As a further example, it may be configured so that only a remote participant is allowed to interact with the virtual assistant system. In this scenario, only the audio of the remote participants may be mixed, processed, and routed to the virtual assistant system for processing. As another example, one virtual assistant system may be dedicated to interaction with local participants while a separate virtual assistant system may be dedicated to interaction with remote participants. In this scenario, the respective audio of the local participants and remote participants may be mixed, processed, and routed to the applicable virtual assistant system for processing.

Another configurable option may be to allow or disallow audio from the virtual assistant system to be heard by a remote participant at the far-end. For example, the remote participant may be allowed to hear audio from the virtual assistant system, such as information in response to inquiries in a voice command. In this scenario, the audio from the virtual assistant system may be routed to both the local participants (e.g., the loudspeakers 102) and to the remote participants. As another example, the remote participant may be disallowed from hearing audio from the virtual assistant system, such as to avoid confusion from too much simultaneous speech. In this scenario, the audio from the virtual assistant system may be routed only to the local participants (e.g., the loudspeakers 102).

As a further example, it may be configured so that only a remote participant is allowed to hear audio from the virtual assistant system. In this scenario, the audio from the virtual assistant system may be routed only to the remote participants. As another example, the audio of one virtual assistant system may be routed to only local participants while the audio of a separate virtual assistant system may be routed to only remote participants. In this scenario, the respective audio of the two virtual assistant systems may be routed to the local participants (e.g., the loudspeakers 102) or to the remote participants.

A further configurable option may be to control the virtual assistant system to allow interaction with particular users and/or voices. For example, the virtual assistant system may be configured to allow only users with certain permissions to interact with the virtual assistant system. As another example, the virtual assistant system may be trained with voices of particular users to allow only those users to interact with the virtual assistant system.

The visual indicator device 110 may be used to show visual feedback regarding the state of the virtual assistant system. The visual indicator device 110 may be mounted to a wall, as shown in FIG. 1, be mounted to a ceiling, or placed on a table or other surface, for example. Persons in the environment 100 may therefore be able to easily see the state of the virtual assistant system as shown by the visual indicator device 110. The visual indicator device 110 may show, for example, different colors, patterns, and/or animations that indicate various states of the virtual assistant system. The states of the virtual assistant system may include, for example, when the virtual assistant system is listening for a voice command; thinking or retrieving information; responding; connecting to other services; denoting the existence of notifications, messages, and/or alerts; the status of a remote virtual assistant system, etc.

In embodiments, the state of the visual indicator device 110 may be synchronized with other components in the environment 100. For example, indicator lights on the loudspeakers 102 and/or microphones 104, 106 may be synchronized with the visual indicator device 110 to show the state of the virtual assistant system. As another example, the display 108 and/or user interface 114 may show a graphic, image, animation, etc. that is synchronized with the visual indicator device 110 to show the state of the virtual assistant system.

Figure 2:
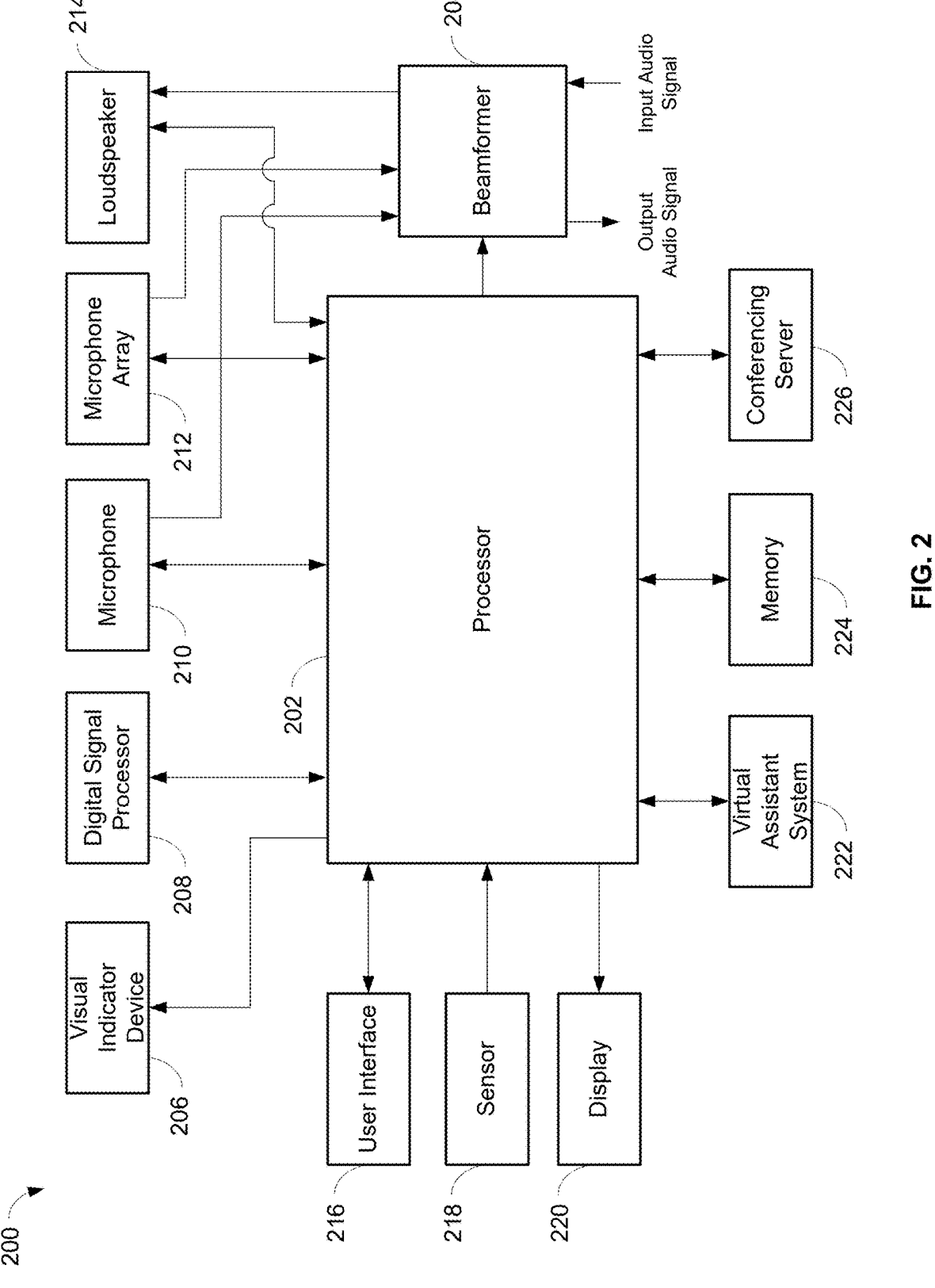
FIG. 2 is a block diagram of a conferencing system that can be integrated with a virtual assistant and controllable using artificial intelligence algorithms, in accordance with some embodiments.

Turning to FIG. 2, a block diagram including a conferencing system 200 is depicted. The conferencing system 200 may enable the integration of a virtual assistant with a conferencing system to utilize the transducers of the conferencing system, as well as enable parameters of devices of the conferencing system to be controlled through the use of artificial intelligence algorithms. In an embodiment, the system 200 may be utilized within the environment 100 of FIG. 1 described above. The components of the system 200 may be in wired and/or wireless communication with the other components of the system 200, as depicted in FIG. 2 and described in more detail below.

The conferencing system 200 in FIG. 2 may include a processor 202 in communication with a memory 224, a beamformer 204, a visual indicator device 206 (e.g., visual indicator device 110 of FIG. 1), a digital signal processor 208, a microphone 210 (e.g., microphone 106 of FIG. 1), a microphone array 212 (e.g., microphone array 104 of FIG. 1), and a loudspeaker 214 (e.g., loudspeaker 102 of FIG. 1). The conferencing system 200 may further include a user interface 216 (e.g., user interface 114 of FIG. 1), a sensor 218 (e.g., camera 116 and/or sensor 118 of FIG. 1), and a display 220 (e.g., display 108 of FIG. 1).

The microphone 210 and the microphone array 212 may detect and capture sounds from audio sources within an environment. The microphone 210 and the microphone array 212 may form various pickup patterns that each have one or more steerable lobes and/or nulls. The beamformer 204 may utilize the audio signals from the microphone 210 and the microphone array 212 to form different pickup patterns, resulting in a beamformed signal. The loudspeaker 214 may convert an audio signal to reproduce sound, and may also have one or more steerable lobes and/or nulls. The beamformer 204 may receive an input audio signal and convert the input audio signal into the appropriate audio signals for each driver of the loudspeaker 214.

In embodiments, the microphone 210, microphone array 212, and/or loudspeaker 214 may be integrated into a single conferencing device. Such a conferencing device may be any type of audio hardware that comprises microphones and/or speakers for facilitating a conference call, webcast, telecast, etc., e.g., SHURE MXA310, MXA910, etc. For example, the conferencing device may include one or more microphones for capturing near-end audio signals produced by conference participants situated in the conferencing environment (e.g., seated around a conference table). The conferencing device may also include one or more speakers for broadcasting far-end audio signals received from conference participants situated remotely but connected to the conference through a conferencing server 226 or other far-end audio source.

The user interface 216 may allow a user to interact with and configure the system 200, such as by viewing and/or setting parameters and/or characteristics of the devices of the system 200. For example, the user interface 216 may be used to view and/or adjust parameters and/or characteristics of the beamformer 204, the digital signal processor 208, the virtual assistant system 222, the conferencing server 226, and/or other options of the system 200, such as directionality, steering, gain, noise suppression, pattern forming, muting, frequency response, RF status, battery status, etc. The user interface 216 may facilitate interaction with users, be in communication with the processor 202, and may be a dedicated electronic device (e.g., touchscreen, keypad, etc.) or a standalone electronic device (e.g., smartphone, tablet, computer, virtual reality goggles, etc.). The user interface 216 may include a screen and/or be touch-sensitive, in embodiments.

The conferencing system 200 may be implemented on a computing device, e.g., computing device 112 of FIG. 1, such as a personal computer (PC), a laptop, a tablet, a mobile device, a smart device, thin client, or other computing platform. In some embodiments, the computing device 112 can be physically located in and/or dedicated to the conferencing environment (or room), as shown in FIG. 1. In other embodiments, the computing device 112 can be part of a network or distributed in a cloud-based environment. In some embodiments, the computing device 112 may reside in an external network, such as a cloud computing network. In some embodiments, the computing device 112 may be implemented with firmware or completely software-based as part of a network, which may be accessed or otherwise communicated with via another device, including other computing devices, such as, e.g., desktops, laptops, mobile devices, tablets, smart devices, etc. In embodiments, the computing device 112 can be any generic computing device comprising a processor and a memory device. The computing device 112 may include other components commonly found in a PC or laptop computer, such as, e.g., a data storage device, a native or built-in audio microphone device and a native audio speaker device.

The digital signal processor 208 may be a dedicated hardware device, or may be an application configured to operate on the computing device 112 and provide, for example, audio compression, auto-mixing, DSP, acoustic echo cancellation, noise reduction, resource monitoring, licensing access, and various audio and/or control interfaces. In embodiments where the digital signal processor 208 operates on the computing device 112, the digital signal processor 208 may leverage components or resources that already exist in the computing device 112 to provide a software-based product. The digital signal processor 208 may be stored in a memory of the computing device 112 and/or may be stored on a remote server (e.g., on premises or as part of a cloud computing network) and accessed by the computing device 112 via a network connection.

The processor 202 may execute conferencing software that is stored in the memory 224, in some embodiments. The conferencing software may be internal, enterprise, proprietary, and/or third party conferencing software (e.g., Microsoft Teams, Zoom, Skype, Bluejeans, Cisco WebEx, GoToMeeting, Join.me, etc.). The conferencing software may be used to receive far-end audio (and/or video) signals associated with a given conference call or meeting from a conferencing server 226, and to transmit an audio (and/or video) output signal back to the far-end participants via the conferencing server 226. As an example, the far-end audio signals may be microphone signals captured by a conferencing device, mobile phone, camera, laptop, desktop computer, tablet, or other audio hardware device that is situated adjacent to the far-end participants and is configured to communicatively connect to the conferencing server 226 associated with the conferencing software. The audio output signal may be broadcast to the far-end participants via the same audio hardware device or a separate loudspeaker or other audio device. The audio output signal may include the audio signals received by a conferencing device at the near-end, for example.

As described previously, the virtual assistant system 222 may be a technology that allows users to issue voice commands for requesting information, controlling devices, etc., while also being able to issue a variety of responses after processing the voice commands. The virtual assistant system 222 may be in communication with the processor 202 in order to enable integration of the components of the conferencing system 200 with the virtual assistant system 222. In particular, the processor 202 may enable voice commands captured by the microphone 210 and/or microphone array 212 (or far-end audio received via the conferencing server 226) to be routed to the virtual assistant system 222 for processing. The processor 202 may also route audio responses from the virtual assistant system 222 to the loudspeaker 214 and/or to the far-end via the conferencing server 226. In addition, the processor 202 may control the visual indicator device 206 based on a state of the virtual assistant system 222.

In embodiments, characteristics of the environment and/or characteristics of the conferencing session that vary as a function of time may be detected and stored by the system 200, which can enable the system 200 to adapt and result in higher quality audio. For example, the processor 202 may utilize an artificial intelligence algorithm and/or perform statistical analysis on the various characteristics to detect patterns. The patterns may be utilized to adaptively optimize future usage of the system 200, and in particular, parameters of devices to be controlled. For example, the intermittent cycling of an HVAC system, positional information of vents in an environment, and/or temperatures in the environment can be tracked over time, and compensated for during sound reinforcement.

It should be understood that the components shown in FIG. 2 are merely exemplary, and that any number, type, and placement of the various components of the system 200 are contemplated and possible. For example, there may be multiple microphones 210, a loudspeaker 214 with a single driver, a loudspeaker array 214, etc. Various components of the system 200 may be implemented using software executable by one or more computers, such as a computing device with a processor and memory, and/or by hardware (e.g., discrete logic circuits, application specific integrated circuits (ASIC), programmable gate arrays (PGA), field programmable gate arrays (FPGA), digital signal processors (DSP), microprocessor, etc.). For example, some or all components of the system 200 may be implemented using discrete circuitry devices and/or using one or more processors (e.g., audio processor and/or digital signal processor) executing program code stored in a memory (not shown), the program code being configured to carry out one or more processes or operations described herein, such as, for example, the methods shown in FIGS. 3-6. Thus, in embodiments, the system 200 may include one or more processors, memory devices, computing devices, and/or other hardware components not shown in FIG. 2. In one embodiment, the system 200 includes separate processors for performing various functionality, and in other embodiments, the system 200 may perform all functionality using a single processor. Furthermore, the components of the system 200 may be in wired or wireless communication with the other components.

Figure 3:
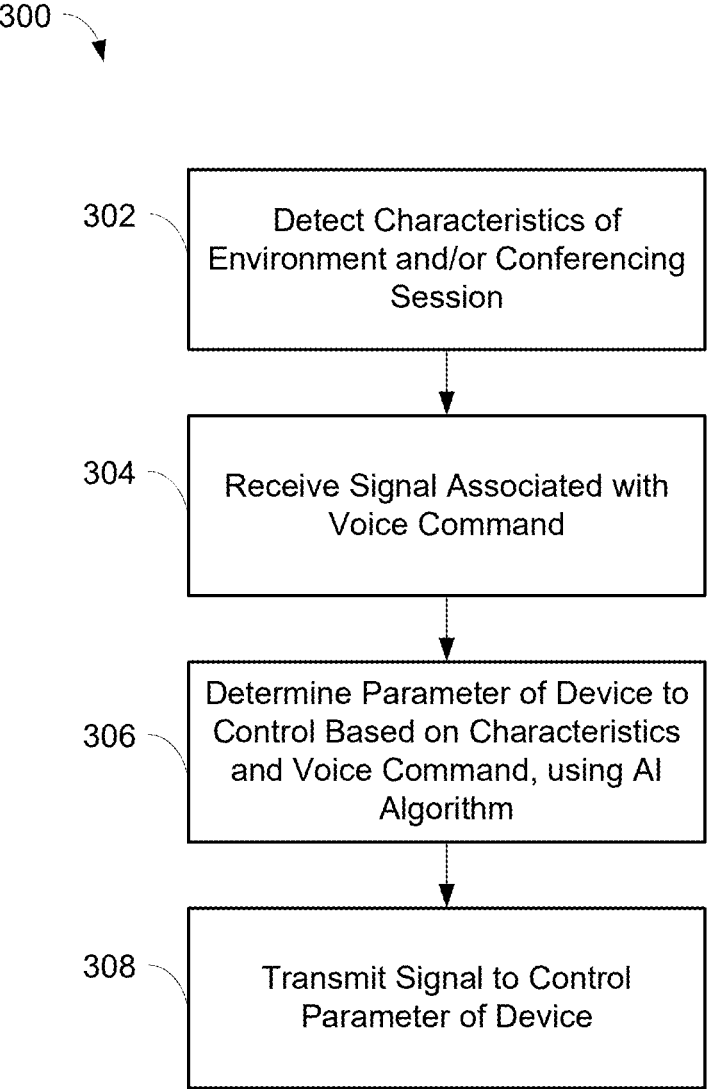
FIG. 3 is a flowchart illustrating operations for facilitating a conferencing session by controlling a parameter of a device based on an artificial intelligence algorithm with the conferencing system of FIG. 2, in accordance with some embodiments.

An embodiment of a process 300 for facilitating a conferencing session with the conferencing system 200 by controlling a parameter of a device based on an artificial intelligence algorithm is shown in FIG. 3. The process 300 may result in a parameter of a device in the conferencing system 200 being controlled in response to receiving and processing a voice command, and analyzing various characteristics of an environment and/or characteristics of the conferencing session.

At step 302, characteristics of the environment and/or characteristics of the conferencing session may be detected. The characteristics of the environment can include the presence and/or location of objects (e.g., people, furniture, equipment, etc.), which can be determined using the sensors 218 (e.g., camera, motion detector, Bluetooth sensor, Wi-Fi sensor, location sensor, etc.), or may be manually input by a user, in some embodiments. The characteristics of the conferencing session can include, for example, scheduling information, participant information, meeting topic information, meeting location information, a far-end audio signal, etc. The processor 202 may retrieve the characteristics of the conferencing session from the conferencing server 226 in some embodiments, or from the memory 224 in other embodiments (e.g., if the characteristics were manually input by a user). In embodiments, the processor 202 may store the characteristics of the environment and/or characteristics of the conferencing session in the memory 224 for later usage by the artificial intelligence algorithm.

A signal associated with a voice command may be received at step 304. The voice command may have been captured by the microphone 210 and/or the microphone array 212, for example. The voice command may correspond to a user request to control an aspect and/or a device of the conferencing system 200. The processor 202 may receive the signal associated with the voice command and determine a parameter of a device to control at step 306. In particular, the processor 202 may utilize an artificial intelligence algorithm at step 306 to analyze the signal associated with the voice command (detected at step 302), and one or more characteristics of the environment and/or the one or more characteristics of the conferencing session (received at step 304). After the processor 202 determines the parameter of the device to control at step 306, a signal may be transmitted to the particular device at step 308 to control the determined parameter.

In embodiments, parameters of devices that may be controlled using the process 300 may include a location of a beam of the microphone 210 and/or microphone array 212 (e.g., via the beamformer 204), a deployment of the beam of the microphone 210 and/or microphone array 212 (e.g., via the beamformer 204), a volume of the loudspeaker 214, a parameter of the digital signal processor 208, and/or a state of the visual indicator device 206. For example, depending on the particular request in the voice command received at step 304, the artificial intelligence algorithm may determine that a lobe or null or the microphone 210, microphone array 212, and/or loudspeaker 214 should be directed to a certain location in the environment. The processor 202 in this scenario can determine the specific parameters of the beamformer 204 to be controlled in order to effectuate movement of the lobe or null.

Figure 4:
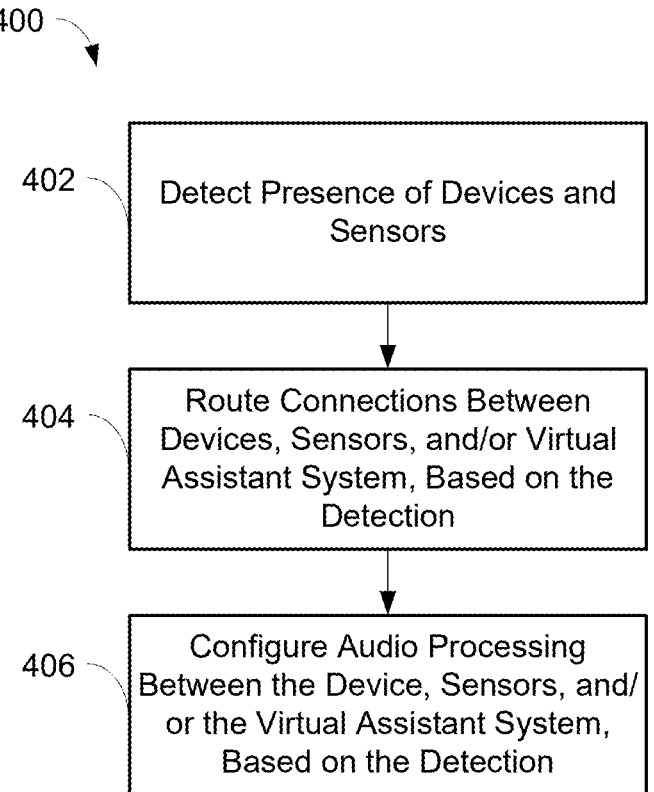
FIG. 4 is a flowchart illustrating operations for configuring the routing and audio processing of the conferencing system of FIG. 2, in accordance with some embodiments.

An embodiment of a process 400 for configuring the routing and audio processing of the conferencing system 200 including the virtual assistant system 222 is shown in FIG. 4. The process 400 may result in the integration of the virtual assistant system 222 with the components of the conferencing system 200, such that the transducers (e.g., the microphone 210, microphone array 212, and/or loudspeaker 214) can be utilized for interaction with the virtual assistant system 222. The process 400 may be utilized, for example, when initially configuring the conferencing system 200 to ease the integration of the virtual assistant system 222.

At step 402, the presence of the components of the conferencing system 200 may be detected by processor 202, as well as how the detected components are already connected to one another, and the potential types of input and output connectivity that the components are capable of. The components of the conferencing system 200 that may be detected may include, for example, the beamformer 204, visual indicator device 206, digital signal processor 208, microphone 210, microphone array 212, loudspeaker 214, user interface 216, sensor 218, and/or display 220.

At step 404, connections between the detected components of the conferencing system 200 may be routed, based on the detection of step 402, in order to allow the functionality of the virtual assistant system 222 to be used via the conferencing system 200. For example, audio signals from the microphone 210 and/or microphone array 212 may be routed to an audio input of the virtual assistant system 222 to allow the virtual assistant system 222 to receive captured voice commands. As another example, the audio output from the virtual assistant system may be connected to the loudspeaker 214 to enable audio responses to be heard in the environment. As a further example, the visual indicator device 206 may be connected to the virtual assistant system 222 so that the visual indicator device 206 can indicate the state of the virtual assistant system 222. As another example, the digital signal processor 208 may be connected to the microphone 210, microphone array 212, loudspeaker 214, and/or the virtual assistant system 222 to enable mixing, noise reduction, and other signal processing of the audio to occur.

At step 406, audio processing between the detected components of the conferencing system 200 may be configured. The audio processing may be configured based on which components of the conferencing system 200 are to be used in conjunction with the virtual assistant system 222. For example, audio captured from the microphone 210 and the microphone array 212 may be configured to be mixed together by the digital signal processor 208, so that the mixed audio is received by the virtual assistant system 222 and/or sent to the far-end of a conferencing session.

In embodiments, the connections and/or the audio processing between components of the conferencing system 200 (at steps 404 and 406) may be configured based on particular locations of participants in the environment. For example, if only participants in a certain location or area are allowed to interact with the virtual assistant system 222, then audio captured from beams of a microphone array 212 at that location or area may be routed to an audio input of the virtual assistant system 222. However, audio for the whole environment (e.g., all the participants) may still be routed, mixed, and sent to the conferencing software to be sent to the far-end of a conference session.

Figure 5:
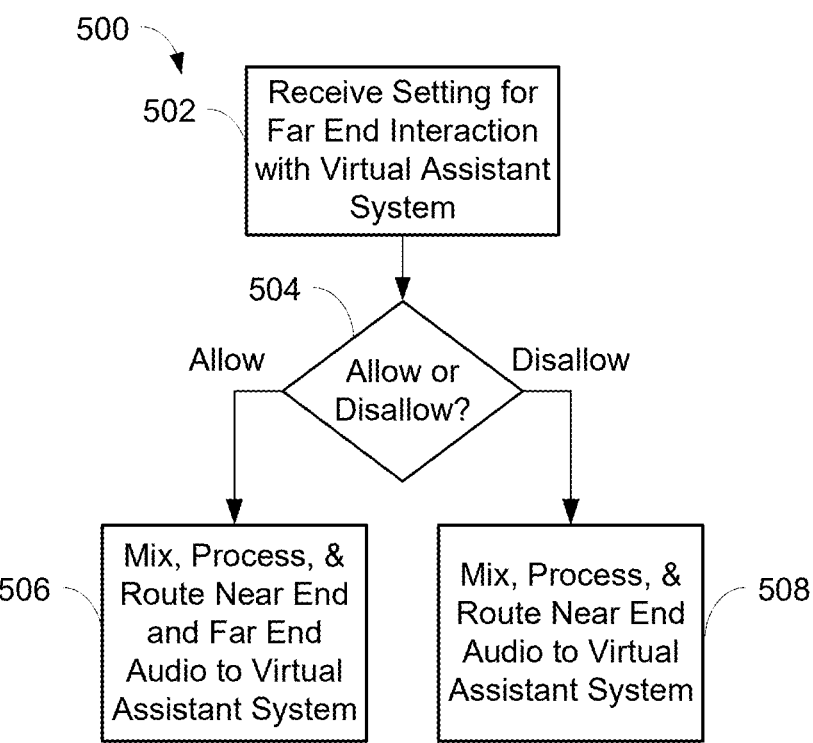
FIG. 5 is a flowchart illustrating operations for configuring far-end interaction with a virtual assistant in the conferencing system of FIG. 2, in accordance with some embodiments.

An embodiment of a process 500 for configuring far-end interaction with the virtual assistant system 222 is shown in FIG. 5. The process 500 may allow a user to configure whether the remote participant at the far-end of a conferencing session is allowed to interact (e.g., issue voice commands) with the virtual assistant system 222.

At step 502, the setting for far-end interaction with the virtual assistant system 222 may be received, such as at the user interface 216 or via a voice command from a local participant. If it is determined at step 504 that the setting received at step 502 is to allow far-end interaction with the virtual assistant system 222, then the process 500 may continue to step 506. At step 506, both the audio of local participants (e.g., captured by microphones 210, 212) and the audio of remote participants (via the conferencing server 226) can be mixed, processed, and routed to the virtual assistant system 222 for processing. However, if it is determined at step 504 that the setting received at step 502 is to disallow far-end interaction with the virtual assistant system 222, then the process 500 may continue to step 508. At step 508, only the audio of the local participants (e.g., captured by microphones 210, 212) may be mixed, processed, and routed to the virtual assistant system for processing. In embodiments, the digital signal processor 208 may perform the mixing and processing of the audio at steps 506 and 508.

In some embodiments, a user may configure that some or all remote participants at the far-end of a conferencing session are allowed to interact with the virtual assistant system 222, and that some or all local participants are not allowed to interact with the virtual assistant system 222. In other embodiments, it may be configured that certain local participants and/or certain remote participants may be allowed or not allowed to interact with the virtual assistant system 222. For example, certain participants may be allowed or not allowed to interact with the virtual assistant system based on criteria related to the participants, e.g., particular locations, persons, etc. In further embodiments, it may be configured to enable local participants and/or remote participants to interact with independent instances of the virtual assistant system 222.

Figure 6:
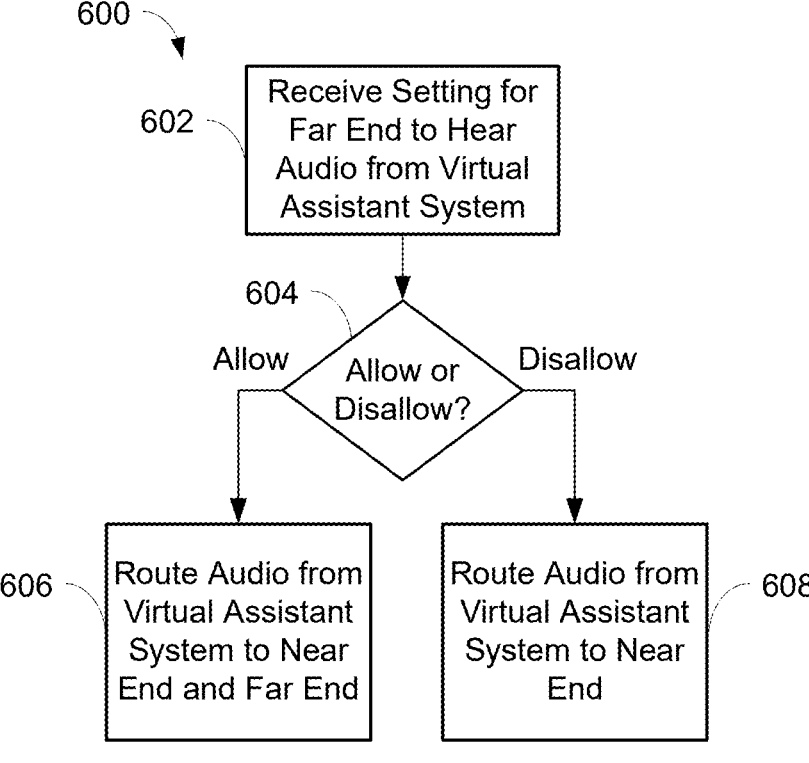
FIG. 6 is a flowchart illustrating operations for configuring whether the far-end can hear audio from a virtual assistant in the conferencing system of FIG. 2, in accordance with some embodiments.

An embodiment of a process 600 for configuring whether the far-end can hear audio from the virtual assistant system 222 is shown in FIG. 6. The process 600 may allow a user to configure whether the remote participant at the far-end of a conferencing session can hear audio (e.g., responses) from the virtual assistant system 222.

At step 602, the setting for whether the far-end can hear audio from the virtual assistant system 222 may be received, such as at the user interface 216 or via a voice command from a local participant. If it is determined at step 604 that the setting received at step 602 is to allow the far-end to hear audio from the virtual assistant system 222, then the process 600 may continue to step 606. At step 606, audio from the virtual assistant system 222 may be routed to both the local participants (e.g., reproduced on loudspeaker 214) and to the remote participants (e.g., via the conferencing server 226). However, if it is determined at step 604 that the setting received at step 602 is to disallow the far-end to hear audio from the virtual assistant system 222, then the process 600 may continue to step 608. At step 608, the audio from the virtual assistant system 222 may be routed to only the local participants (e.g., reproduced on loudspeaker 214).

In some embodiments, a user may configure that only the remote participant at the far-end of a conferencing session can hear the audio from the virtual assistant system 222, and that the local participant does not hear the audio from the virtual assistant system 222. In other embodiments, it may be configured to enable local participants and remote participants to hear the audio from independent instances of the virtual assistant system 222.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A system, comprising:
   a plurality of devices comprising a visual indicator device and an audio device, wherein the audio device has a visual indicator, and wherein the audio device is located a first location in a physical environment and the visual indicator device is located at a second location in the physical environment; and
   one or more processors in communication with the visual indicator device, the audio device, and a virtual assistant system, any of the one or more processors configured to:
      receive a first signal from the virtual assistant system, wherein the first signal is configured to indicate a state of the virtual assistant system; and
      in response to receiving the first signal,
         (1) transmit a second signal to the audio device at the first location in the physical environment to control the visual indicator of the audio device to indicate the state of the virtual assistant system; and
         (2) transmit a third signal to the visual indicator device at the second location in the physical environment to control the visual indicator device to indicate the state of the virtual assistant system.

2. The system of claim 1, wherein the visual indicator of the audio device is synchronized with the visual indicator device.

3. The system of claim 1, further comprising an activation switch in communication with the one or more processors, wherein the one or more processors is further configured to:
   route a voice command to the virtual assistant system when the activation switch is activated; and
   not route the voice command to the virtual assistant system when the activation switch is not activated.

4. The system of claim 3, wherein the one or more processors is further configured to: control the visual indicator device and the visual indicator of the audio device, based on the state of the activation switch.

5. The system of claim 4, wherein the one or more processors is further configured to control the visual indicator device and the visual indicator of the audio device to be in a first state when the activation switch is activated and to be in a second state when the activation switch is not activated.

6. The system of claim 1, wherein any of the one or more processors is further configured to:
   receive a signal associated with a voice command;

determine a parameter of the audio device to control, based on executing an artificial intelligence algorithm that analyzes (1) the signal associated with the voice command and (2) one or more of a characteristic of the physical environment or a characteristic of a conferencing session; and responsive to the determination, transmit a signal to control the parameter of the audio device.

7. The system of claim 6, wherein any of the one or more processors is further configured to process and route the voice command sensed by the audio device to the virtual assistant system; and wherein any of the one or more processors is configured to receive the signal associated with the voice command from the virtual assistant system.

8. The system of claim 6, wherein any of the one or more processors is configured to determine the parameter of the audio device to control, based on executing the artificial intelligence algorithm to further analyze one or more of the characteristic of the physical environment or the characteristic of the conferencing session over a period of time.

9. The system of claim 6, wherein the parameter of the audio device to control comprises one or more of a location of a beam of a microphone, a deployment of the beam of the microphone, a volume of a loudspeaker, or a parameter of a digital signal processor.

10. The system of claim 6, wherein any of the one or more processors is configured to determine the parameter of the audio device to control, based on executing the artificial intelligence algorithm to further analyze an existing parameter of the audio device.

11. The system of claim 6, wherein the characteristic of the physical environment comprises one or more of a presence of an object in the physical environment or a location of the object in the physical environment.

12. The system of claim 6, wherein the characteristic of the conferencing session comprises one or more of scheduling information, participant information, meeting topic information, location information, or a far-end audio signal.

13. The system of claim 6, wherein any of the one or more processors is configured to determine the parameter of the audio device to control, based on executing the artificial intelligence algorithm to further analyze natural language of the signal associated with the voice command.

14. The system of claim 1, wherein any of the one or more processors is configured to:

receive a setting to configure interaction with the virtual assistant system by a participant of a conferencing session, based on a permission level associated with the participant;

process and route audio of the participant sensed by the audio device to the virtual assistant system, when the permission level associated with the participant is to allow the interaction with the virtual assistant system; and block the audio of the participant from being routed from the audio device to the virtual assistant system, when the permission level associated with the participant is to disallow the interaction with the virtual assistant system.

15. The system of claim 14, wherein any of the one or more processors is further configured to automatically configure the permission level associated with the participant for the interaction with the virtual assistant system, based on a voice of the participant.

16. The system of claim 14, wherein any of the one or more processors is further configured to configure routing of audio from the virtual assistant system to the participant, based on the permission level associated with the participant.

17. The system of claim 14, wherein the permission level associated with the participant is related to a location of the participant.

18. A method, comprising:

receiving a first signal from a virtual assistant system, wherein the first signal is configured to indicate a state of the virtual assistant system; and in response to receiving the first signal, (1) transmitting a second signal to an audio device located at a first location in a physical environment to control a visual indicator of the audio device to indicate the state of the virtual assistant system; and (2) transmitting a third signal to a visual indicator device located at a second location in the physical environment to control the visual indicator device to indicate the state of the virtual assistant system.

19. The method of claim 18, further comprising:

receiving a signal associated with a voice command;

determining a parameter of the audio device to control, based on executing an artificial intelligence algorithm that analyzes (1) the signal associated with the voice command and (2) one or more of a characteristic of the physical environment or a characteristic of a conferencing session; and responsive to the determination, transmitting a signal to control the parameter of the one or more audio device.

20. The method of claim 18, further comprising:

receiving a setting to configure interaction with the virtual assistant system by a participant of a conferencing session, based on a permission level associated with the participant;

processing and routing audio of the participant sensed by the audio device to the virtual assistant system, when the permission level associated with the participant is to allow the interaction with the virtual assistant system; and blocking the audio of the participant from being routed from the audio device to the virtual assistant system, when the permission level associated with the participant is to disallow the interaction with the virtual assistant system.

* * * * *